No. 659,318. Patented Oct. 9, 1900.
G. T. PILLINGS.
MOTOR VEHICLE.
(Application filed July 7, 1900.)
(No Model.) 3 Sheets—Sheet 1.

WITNESSES:

INVENTOR

BY

ATTORNEY

No. 659,318. Patented Oct. 9, 1900.
G. T. PILLINGS.
MOTOR VEHICLE.
(Application filed July 7, 1900.)
(No Model.) 3 Sheets—Sheet 2.

WITNESSES:
INVENTOR
BY
ATTORNEY

No. 659,318. Patented Oct. 9, 1900.
G. T. PILLINGS.
MOTOR VEHICLE.
(Application filed July 7, 1900.)
(No Model.) 3 Sheets—Sheet 3.

WITNESSES:
Franck L. Ourand.
W. Parker Rinehl.

INVENTOR
George T. Pillings.
BY
D. L. Rinehl
ATTORNEY

THE NORRIS PETERS CO., PHOTO-LITHO., WASHINGTON, D. C.

UNITED STATES PATENT OFFICE.

GEORGE T. PILLINGS, OF ELGIN, ILLINOIS.

MOTOR-VEHICLE.

SPECIFICATION forming part of Letters Patent No. 659,318, dated October 9, 1900.

Application filed July 7, 1900. Serial No. 22,834. (No model.)

*To all whom it may concern:*

Be it known that I, GEORGE T. PILLINGS, a citizen of the United States, residing at Elgin, in the county of Kane and State of Illinois, have invented certain new and useful Improvements in Motor-Vehicles; and I do hereby declare the following to be a full, clear, and exact description of the invention, such as will enable others skilled in the art to which it appertains to make and use the same.

My invention relates to motor-vehicles or automobiles, and has for its object an easy-riding vehicle; and it consists in certain improvements in construction in the frame and the axle-boxes to prevent disturbing the equilibrium of the body of the vehicle in passing over obstructions or ruts or gullies in the roadway, as will be fully disclosed in the following specification and claims.

Figure 1:
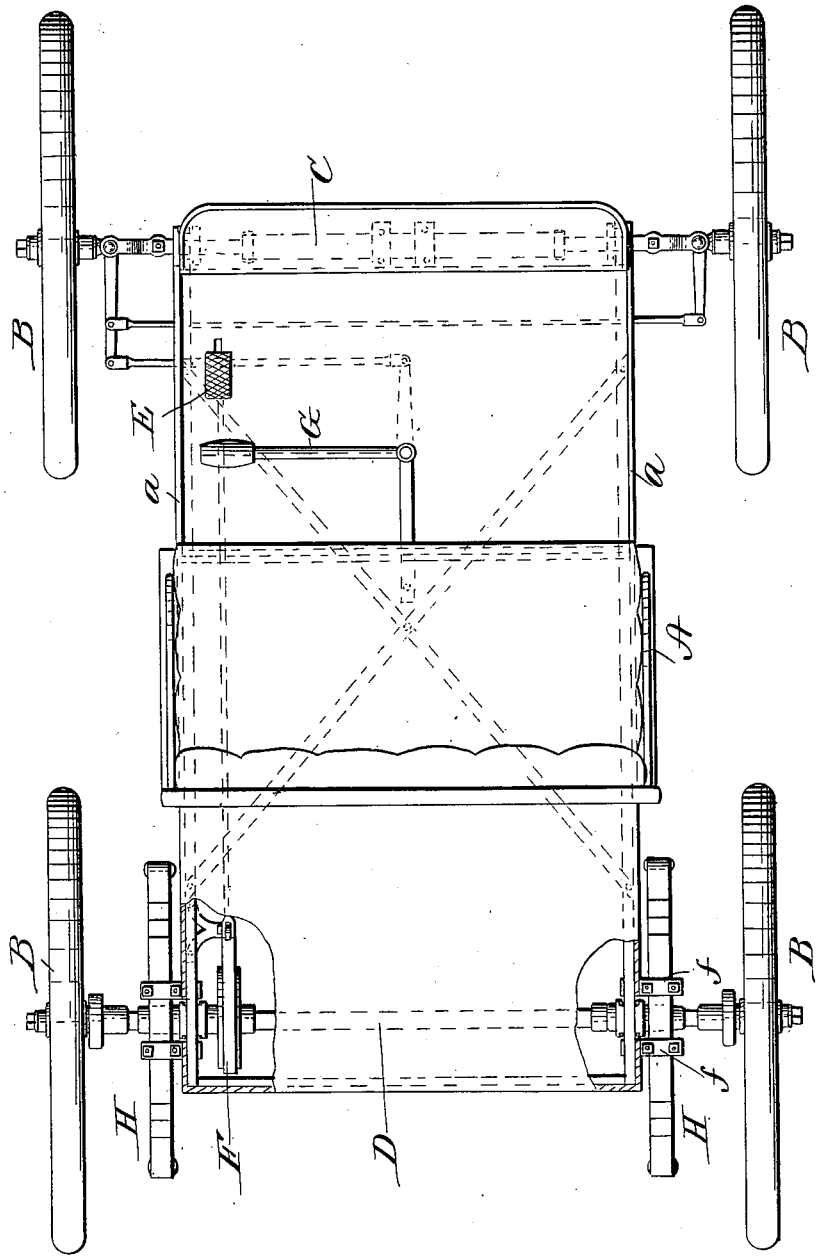
Figure 2:
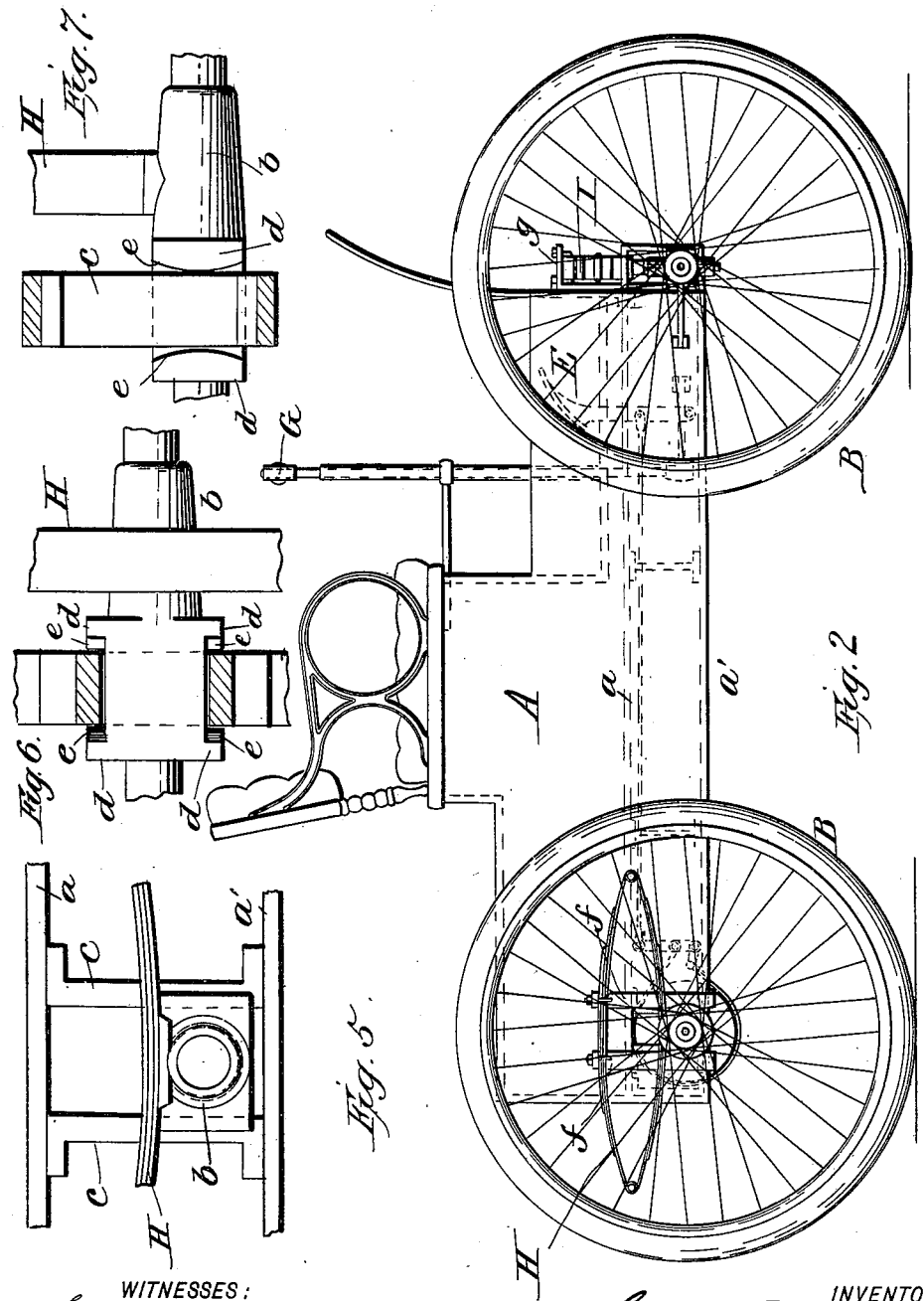
Figure 3:
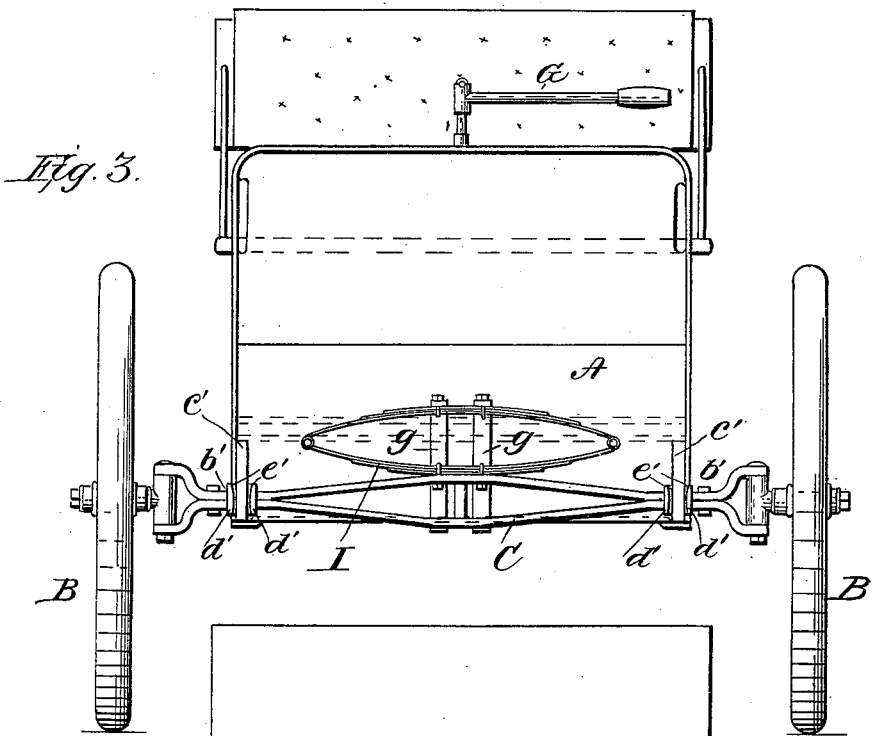
Figure 4:
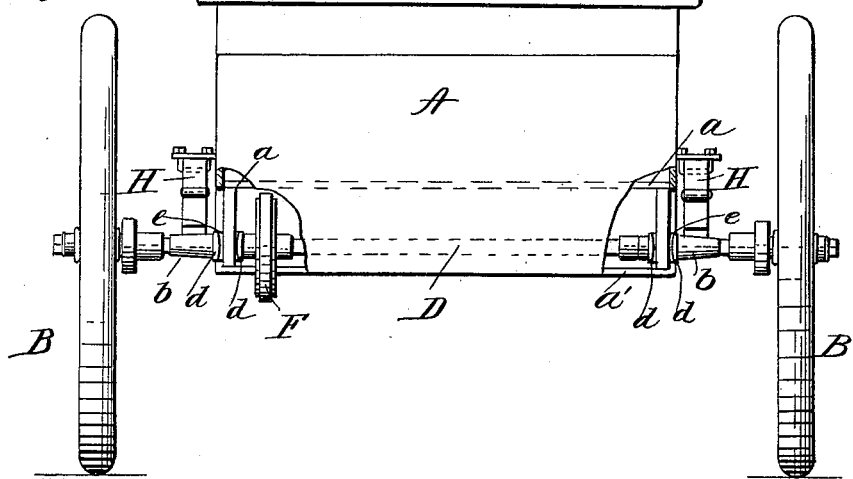

In the accompanying drawings, which form part of this specification, Figure 1 represents a top plan view of my improved motor-vehicle; Fig. 2, a side elevation of the same; Fig. 3, a front elevation; Fig. 4, a rear elevation; Fig. 5, an enlarged detail showing a side view of part of the frame with one of the axle-boxes at the lower end of the jaws; Fig. 6, a horizontal section of the same; and Fig. 7, a side elevation of the same, partly in section.

Reference being had to the drawings and the letters thereon, A indicates the body of the vehicle, B the wheels, C the front axle, D the rear axle, E the foot-brake lever, F the brake, and G the guiding or controlling lever, all of which may be of any approved form of construction.

The frame supporting the body is made of two parallel bars $a$ $a'$, of metal, to which the rear axles are secured by axle-boxes $b$, which are supported between and engage the outer edges of the vertical jaws $c$ $c$, secured to and between the upper bar $a$ and the lower bar $a'$ of the frame, and these bars may be flat, as shown, or angular or tubular, as preferred.

The axle-boxes are provided with vertical flanges $d$ $d$, having convex inner surfaces $e$ $e$, which engage the edges of the jaws $c$ $c$ and slide freely thereon to allow the axle-boxes to rise and fall between the jaws as the wheels pass over an obstruction, rut, or gully in the roadway, and by the convexity of the surfaces $e$ $e$ of the flanges $d$ $d$ the angle of the axle to the jaws of the frame may vary to a great extent without producing a jar to or disturbing the equilibrium of the body of the vehicle in its relation to the frame or in the least incommoding the occupant of the vehicle. The rear axle-boxes support the rear springs H, and the rear end of the body of the vehicle is suspended upon these springs by clips $f f$, as shown in Figs. 1, 4, and 5, while the front end of the body is supported upon a spring I, secured to the front axle by clips $g$ $g$. The front axle is provided with axle-boxes $b'$, having only the vertical flanges $d'$, provided with convex inner surfaces $e'$ $e'$, which engage the vertical jaws $c'$ $c'$ and slide freely thereon in like manner as the boxes $b$ on the rear axle. By this construction the frame is relieved of all twists and contortions and crystallization of the metal prevented.

Having thus fully described my invention, what I claim is—

1. A motor-vehicle frame provided with vertical jaws secured to the frame; in combination with boxes secured to the axles and having flanges provided with inner convex surfaces engaging said jaws.

2. A motor-vehicle frame composed of parallel bars having vertical jaws secured between them; in combination with boxes secured to the axles and having flanges provided with convex inner surfaces engaging the edges of said jaws.

3. A motor-vehicle frame provided with vertical jaws secured to the frame; in combination with axle-boxes supporting springs and having flanges engaging said jaws.

4. A motor-vehicle frame provided with vertical jaws secured to the frame; in combination with a box secured to the axle, supporting a spring and provided with flanges having convex bearing-surfaces engaging the edges of said jaws.

In testimony whereof I affix my signature in presence of two witnesses.

GEORGE T. PILLINGS.

Witnesses:
 CORA M. TIDMARSH,
 JOSIAH L. FOOTE.